Feb. 21, 1961 M. L. FOERSTER 2,972,315
APPARATUS FOR FORMING FOOD PRODUCTS
Filed June 2, 1959 2 Sheets-Sheet 1
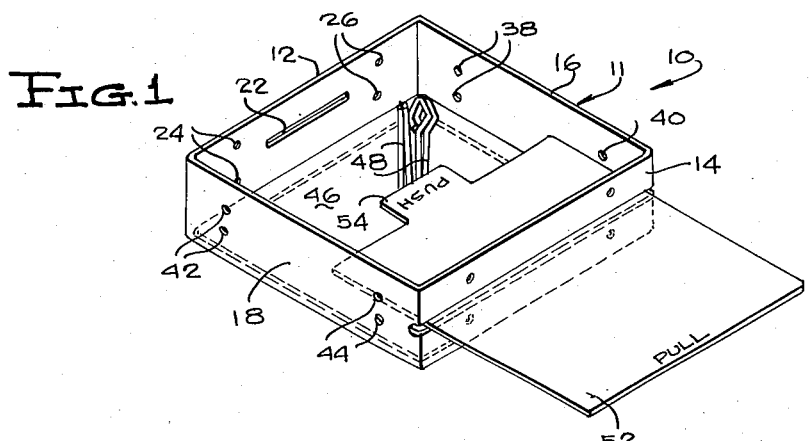
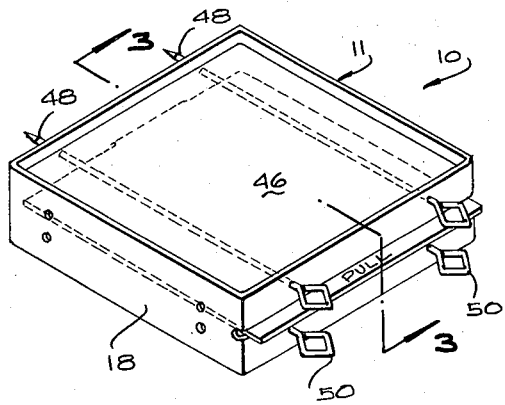
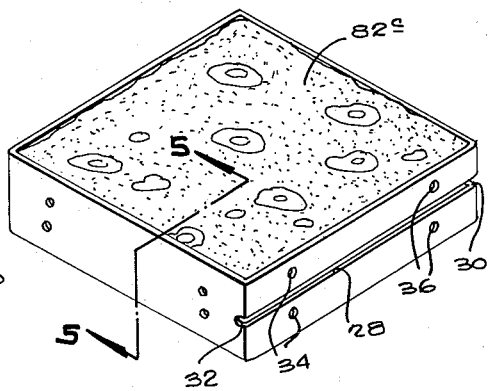
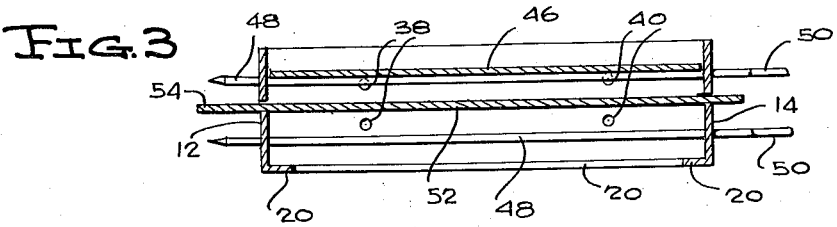
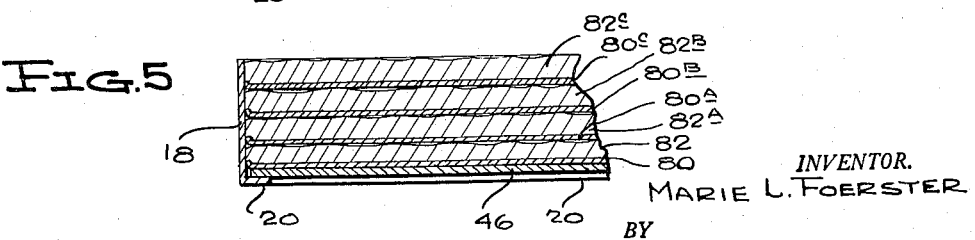
INVENTOR.
MARIE L. FOERSTER
BY
McMorrow, Berman & Davidson
ATTORNEYS Feb. 21, 1961   M. L. FOERSTER   2,972,315
APPARATUS FOR FORMING FOOD PRODUCTS
Filed June 2, 1959   2 Sheets-Sheet 2

INVENTOR.
MARIE L. FOERSTER
BY
McMorrow, Berman & Davidson
ATTORNEYS

United States Patent Office 2,972,315
Patented Feb. 21, 1961

2,972,315

APPARATUS FOR FORMING FOOD PRODUCTS

Marie L. Foerster, 17 Ave. 53, Playa Del Rey, Calif.

Filed June 2, 1959, Ser. No. 817,580

4 Claims. (Cl. 107—1)

This invention relates to, in its possibly broadest sense, a molding apparatus and, more specifically, the instant invention pertains to an apparatus for processing food articles.

One of the primary objects of this invention is to provide an apparatus for forming a laminated food product.

Another object of this invention is to provide an apparatus for forming a multi-layered food product which, when cut into desired shapes serve as canapes or hors d'oeuvres.

A further object of this invention is to provide an apparatus for molding food products in attractive configurations.

A still further object of this invention is to provide a food preparing apparatus in which the several components of the apparatus serve dual functions.

This invention contemplates, as a still further object thereof, the provision of food processing apparatus which is non-complex in construction and assembly, inexpensive to manufacture and maintain, and which is durable in use.

Other and further objects and advantages of the instant invention will become more evident from a consideration of the following specification when read in conjunction with the annexed drawings, in which:

Figure 1 is a perspective view of the food processing apparatus and the component elements thereof;

Figure 2 is a perspective view of the apparatus illustrated in Figure 1, Figure 2 illustrating the apparatus assembled in one of its operative positions;

Figure 3 is a detail medial cross sectional view, Figure 3 being taken substantially on the vertical plane of line 3—3 of Figure 2, looking in the direction of the arrows;

Figure 4 is a perspective view of the apparatus illustrated in Figures 1 and 2, the apparatus as illustrated herein being shown as charged or filled with one or more food products;

Figure 5 is an enlarged fragmentary detail cross-sectional view taken substantially upon the vertical plane of line 5—5 of Figure 4, looking in the direction of the arrows;

Figure 6:
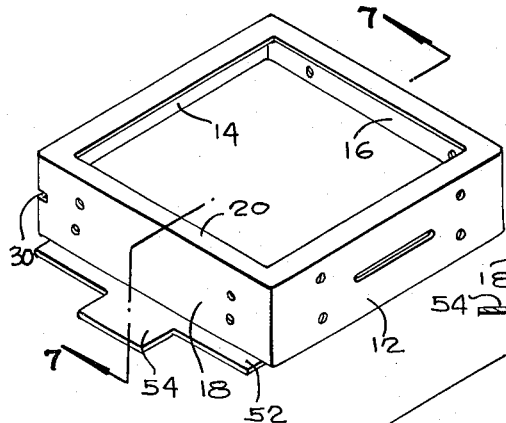
Figure 6 is an inverted perspective view of the mold frame and illustrating the same in conjunction with a divider plate, this view illustrating one of the process steps.
Figure 7:
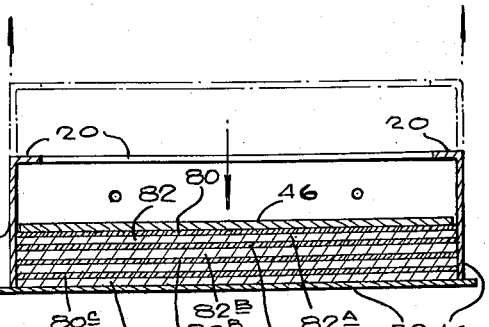
Figure 7 is a detail medial cross-sectional view similar to Figure 6, Figure 7 being shown as partially filled with multi-layers of food products and including the pressure plate of the apparatus.

Referring now more specifically to the drawings, reference numeral 10 designates, in general, apparatus devised to carry out the teaching of this invention. As is illustrated in the several figures of the drawings, the apparatus 10 includes an integrally formed substantially open rectangular frame 11 having opposed pairs of side walls 12, 14 and 16, 18, and an integrally formed inwardly extending continuous peripheral flange 20 at the lower ends thereof (see Figures 6 and 8). The side wall 12 is provided with a horizontal centrally positioned slot 22 intermediate the ends thereof, and a pair of transversely extending, vertically spaced apertures 24 and 26 adjacent each of its respective ends. The opposed side wall 14 is formed with a horizontal slot 28 which extends transversely therethrough for its entire length and communicates at its opposed ends with notches 30, 32 formed in adjacent sides of the side walls 16, 18. As is seen in the drawings, the slots 22, 28 are aligned with one another. Adjacent each end of the side wall 14 are provided pairs of transversely extending, vertically spaced apertures 34 and 36, respectively, which are aligned with the pairs of apertures 24 and 26, respectively.

The side wall 16 is constructed with pairs of transversely extending, vertically spaced openings 38 and 40, each pair being disposed proximate one of its respective ends which are aligned with similar vertically spaced pairs of openings 42 and 44, respectively, which extend through the opposed side wall 18 adjacent each of its ends.

Reference numeral 46 denotes a substantially rectangular pressure and/or support plate which is adapted to be slidably received within the above described frame and is adapted, under some conditions to seat against the peripheral flange 20, and under other conditions to be supported within the frame 11 on a plurality of elongated substantially cylindrical rods 48 having enlarged closed loop-type finger gripping ends 50. As will be described below, the rods 48 are designed to be slidably and selectively received within the aligned pairs of apertures and openings described above to serve various functions.

Reference numeral 52 denotes a substantially rectangular divider plate having a longitudinally extending centrally positioned tongue 54 integrally formed therewith and projecting from an end thereof. The divider plate 52 is adapted to be slidably received through the slot 28 and to extend transversely across the frame 11 with the tongue 54 slidably engaged within the slot 22. As is seen in the drawings, the length of the divider plate 52 and the tongue 54 are such as to permit the remotely disposed ends thereof to project beyond the oppositely disposed end walls 12, 14 to afford finger gripping or operating means for the operator of the apparatus, and to provide space for the legends "PUSH" and "PULL."

The several parts of the apparatus 10 may be conveniently stored away by seating the pressure or support plate 46 on the flange 20 and then loosely disposing the rods 48 thereon after which the divider plate 52 is inserted through the slot 28 and the tongue 54 engages within the slot 22 to form a closed receptacle.

The component elements of the apparatus 10 described above are preferably formed of a suitable metal or plastic, and set forth infra are described various methods illustrating its versatility in the preparation of attractive laminated food products.

Figures 9, 10:
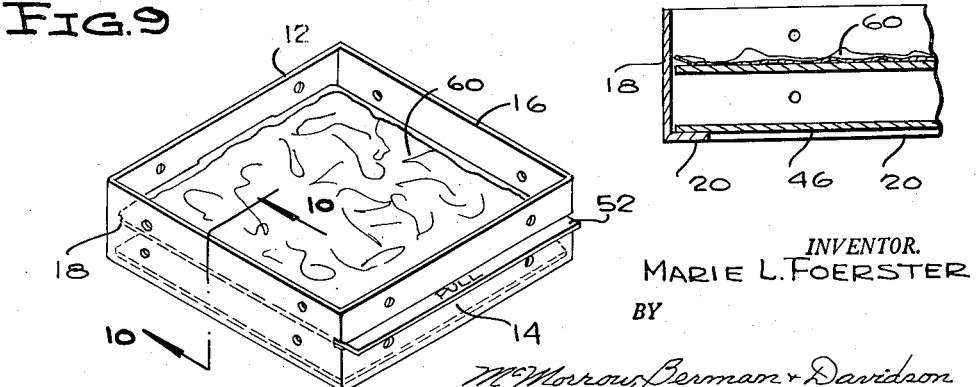
Figure 9 is a perspective view of the mold frame and divider plate assembled in an operative condition taken together with a foil lining for the divider plate and illustrating another process step; and, Figure 10 is an enlarged fragmentary detail cross-sectional view taken substantially on the vertical plane of line 10—10 of Figure 9, looking in the direction of the arrows.

Perhaps the most simple example of preparing a multi-layer food product in accordance with this invention may be described by reference to Figures 1, 9 and 10. Let it be assumed that a bi-layer food product is desired. In this case, the divider plate 52 is pulled out of the frame 11, and the rods 48 are removed therefrom. The divider plate 52 is now replaced and a first layer of food is packed thereon substantially to the plane of the upper edges of the side walls 12, 14, 16 and 18. The divider plate 52 is now removed to permit the first layer to slide downwardly between the side walls and to come to rest on the pressure or support plate 46. A second layer of a different food is now packed on top of the first layer and is trimmed level or flush with the upper ends of the side walls by the divider plate 52 which now acts as a spatula. The divider plate 52 is now placed over the open upper end of the frame 11 and the apparatus is inverted (see Figure 6). The user now applies force to the pressure plate 46 to compact and mold the two food layers and to simultaneously therewith effect a bond between adjacent sides thereof, and while continuing the pressure, the frame 11 is lifted upwardly away from the divider plate 52. The laminated article may now be slid off the divider plate directly onto a serving dish or cooking utensil for heating, cooking or other processing if the end product requires the same, and the pressure plate 46 is also removed. If the product is to be broiled or barbecued, it is advisable when using some food products as the first layer such as mashed potatoes, for example, to first line the divider plate 52 with a layer of aluminum or other suitable cooking foil indicated at 60 in Figures 9 and 10.

Figures 2 to 7, inclusive, illustrate another method for preparing a laminated or multi-layered food product. As is illustrated in these figures, the food product is made in the following manner. The apparatus is first assembled as shown in Figure 2, that is, the rods 48 are inserted in the pairs of aligned apertures 24, 34 and 26, 36, respectively, and the divider plate 52 is supported transversely of the frame 11 in the aligned slots 22, 28 as described supra. It should be noted at this point that the lower pairs of aligned apertures, the aligned slots, and the uppermost pairs of the aligned apertures are spaced, approximately, ¼, ½ and ¾, respectively, of the width of the side walls 12, 14 above the flange 20.

The pressure or support plate 46 is now placed on the uppermost pair of the rods 48. A layer of food such as, for example, a slice of cheese 80 is now placed on the support plate 46 and this is followed by a layer of luncheon meat 82. Obviously, other foods could be used at the option of the operator. The cavity between the support plate 46 and the upper edges of the side walls should be substantially filled by the two foods, 80, 82.

The operator now grasps the handles 50 of the uppermost pair of rods 48 and pulls thereon to remove the same from the frame 11 thereby permitting the support plate 46 and the foods thereon to drop onto the divider plate 52. A second layer of cheese 80A is now superimposed on the first layer of luncheon meat 82, and thereafter a second layer of luncheon meat 82A is placed thereon.

The divider plate 52 is now removed and the support plate 46 together with the four layers of food descend to the lowermost pairs of rods 48. A third layer of cheese 80B is now placed over the luncheon meat 82A and this is followed by a third layer of luncheon meat 82B.

The lowermost pairs of rods 48 are now removed and the support plate 46 descends in the frame 11 until it seats on the flange 20 and thereafter a fourth layer of cheese 80C is placed on the luncheon meat 82B and this is followed by a fourth layer of luncheon meat 82C.

The frame 11 and the foods therein now appear as is shown in Figures 4 and 5.

The upper end of the frame 11 is now covered with the divider plate 52 and both are inverted (see Figure 6). The user now exerts pressure on the plate 46 to compress the tiers of foods together in the manner shown in Figure 7. While continuing to exert pressure on the plate 46, the frame 11 is pulled upwardly in a direction away from the divider plate 52 (illustrated in phantom lines in Figure 7) to separate the frame 11 from the multi-layer foods.

The plate 46 is now removed the laminated food product may be sliced in desired configurations and secured on toothpicks for serving as appetizers or hors d'oeuvres.

Figure 8:
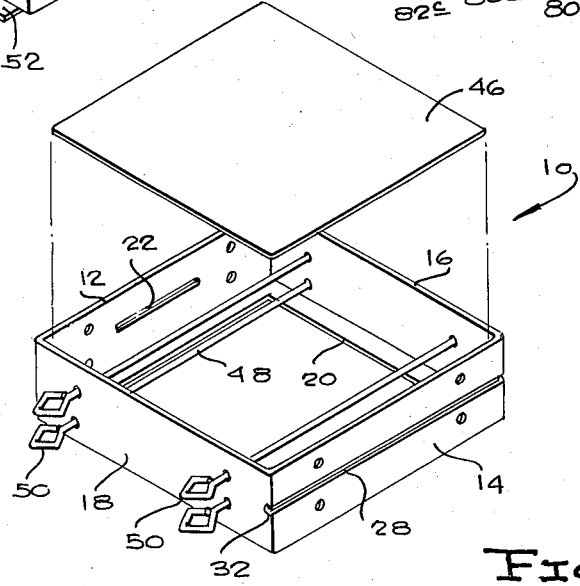
Figure 8 is an exploded perspective view of the apparatus illustrating the same in one of its operative positions.

Figure 8 illustrates the apparatus assembled for use in making a three layered product. In this instance, the rods 48 extend through the aligned pairs of apertures 38, 42 and 40, 44, respectively and the above described process is carried out in the manner described above with the exception of the fact that the divider plate 52 is not utilized. The openings 38, 42, 40 and 44 are vertically spaced substantially one-third and two-thirds of the width of the side walls 16, 18.

In carrying out the several steps of making the laminated food product, the divider plate 52 may be used as a spatula except when the same is employed as support means for the plate 46.

The apparatus 10, due to the relative thinness of the side walls, may be utilized as a cutting instrument for shaping and cutting biscuit dough and pastry dough. It is preferably of such size that the shaped dough would approximate a slice of bread. This makes the laminated food, processed in the shaper, fit neatly upon such dough or bread.

Having described and illustrated this invention in detail, it is to be understood that the same is offered for exemplary purposes only, and that this invention is to be limited only by the scope of the appended claims.

What is claimed is:

1. Food molding apparatus comprising an open frame having sidewalls and end walls having a common upper edge, an internal lateral flange on the walls at their lower edges, opposed walls having longitudinally spaced rod holes spaced upwardly from said flange, the rod holes of opposed walls being in horizontally aligned relationship, removable rods engaged through aligned rod holes, a combined pressure and support plate optionally resting upon rods or upon said flange, opposed walls having aligned horizontal slots therein spaced from the rod holes and the internal flange, and a divider plate engaged through said slots and extending across the interior of the frame.

2. Food molding apparatus comprising an open frame having sidewalls and end walls having a common upper edge, an internal lateral flange on the walls at their lower edges, said walls having rod holes at their ends, the rod holes of opposed walls being in horizontally aligned relationship, removable rods extending through aligned rod holes and across the interior of the frame, a combined pressure and support plate slidably engaged in the frame to selectively rest either upon the rods or upon said internal flange, one of said walls having a primary horizontal central slot and the opposite wall having a secondary horizontal slot along its entire length, said slots being vertically spaced from said rod holes and said flange, and a divider plate engageable through the secondary slot to extend across the interior of the frame, said divider plate having a forward end having a tongue thereon to engage in the primary slot.

3. Food molding apparatus comprising an open frame having sidewalls and end walls, said walls having a common upper edge, an internal lateral flange on said walls at the lower edges thereof, said walls having vertically spaced upper and lower rod holes at their ends, the holes of opposed walls being in horizontally aligned relationship, upper and lower rods selectively engageable through related holes of opposed walls, a first plate slidably engaged in the frame and restable upon rods or upon said flange, one of said walls having a primary horizontal central slot and the opposite wall having a secondary horizontal slot along its entire length, said slots being disposed between and vertically spaced from said upper and lower rod holes and said flange, and a second plate removably engaged through said secondary slot and extending across the interior of the frame, said second plate having a forward end having a tongue thereon engaged through said primary slot.

4. Food molding apparatus comprising an open rectangular frame having sidewalls and end walls, said walls having a common upper edge, an internal lateral flange on the walls at their lower edges, said sidewalls having longitudinally spaced pairs of vertically spaced rod holes at their ends which are aligned with each other across the frame and spaced above said internal flange, said end walls having similar pairs of rod holes, the rod holes of the end walls being vertically displaced with respect to the rod holes of the sidewalls, removable rods selectively engageable through rod holes of the walls, a combined pressure and support plate slidably engaged in said frame to rest optionally upon rods or upon said internal flange, one of said walls having a primary horizontal central slot and the opposite wall having a secondary horizontal slot along its entire length, said slots being vertically spaced between rod holes, and a removable divider plate engaged through said secondary slot and extending across the interior of the frame, said plate having a tongue on one end extending through said primary slot.

References Cited in the file of this patent

UNITED STATES PATENTS

| | | |
|---|---|---|
| 2,181,666 | Molin | Nov. 28, 1939 |
| 2,650,552 | Wood | Sept. 1, 1953 |
| 2,868,145 | Brooke | Jan. 13, 1959 |